(12) United States Patent
Duston et al.

(10) Patent No.: US 6,796,082 B1
(45) Date of Patent: Sep. 28, 2004

(54) OUTDOOR INSECT BAIT STATION

(75) Inventors: Tyler D. Duston, Evanston, IL (US); David O. Brower, Racine, WI (US); Scott W. Demarest, Caledonia, WI (US); Steven B. Mineau, Waterford, WI (US)

(73) Assignee: S.C. Johnson & Son, Inc., Racine, WI (US)

( * ) Notice: Subject to any disclaimer, the term of this patent is extended or adjusted under 35 U.S.C. 154(b) by 0 days.

(21) Appl. No.: 10/615,886

(22) Filed: Jul. 9, 2003

(51) Int. Cl.⁷ ................................................ A01M 1/20
(52) U.S. Cl. ...................................................... 43/131
(58) Field of Search ............................. 43/131, 132.1, 43/124; 47/43, 44, 47

(56) References Cited

U.S. PATENT DOCUMENTS

| | | | |
|---|---|---|---|
| 2,799,122 A | * | 7/1957 | Jannone .......................... 47/47 |
| 2,837,861 A | | 6/1958 | Graham |
| 4,277,907 A | | 7/1981 | Ernest |
| 4,307,540 A | * | 12/1981 | Reisner ....................... 47/40.5 |
| 4,483,098 A | * | 11/1984 | Anderson ....................... 47/47 |
| 4,485,582 A | | 12/1984 | Morris |
| 4,519,162 A | * | 5/1985 | Stuckey .......................... 47/47 |
| 4,793,093 A | * | 12/1988 | Gentile .......................... 43/131 |
| 5,325,626 A | | 7/1994 | Jackson |
| 5,746,021 A | | 5/1998 | Green |
| 5,802,761 A | * | 9/1998 | Demarest et al. .............. 43/131 |
| 5,918,410 A | | 7/1999 | Knuppel |
| 6,065,241 A | * | 5/2000 | Woodruff .................... 43/132.1 |
| 6,164,010 A | | 12/2000 | Snell et al. |
| 6,219,960 B1 | | 4/2001 | Contadini et al. |
| 6,272,791 B1 | * | 8/2001 | Pleasants ...................... 43/131 |
| 6,298,597 B1 | | 10/2001 | Koehler et al. |
| 6,373,391 B1 | * | 4/2002 | Lake et al. .............. 340/573.1 |
| 6,401,384 B1 | | 6/2002 | Contadini et al. |
| 6,467,216 B2 | | 10/2002 | McManus et al. |
| 6,474,015 B1 | * | 11/2002 | Lund et al. .................... 43/124 |
| 6,474,016 B2 | | 11/2002 | Snell et al. |
| 6,497,070 B1 | | 12/2002 | Snell et al. |
| 6,594,948 B1 | * | 7/2003 | Novack ........................ 43/131 |
| 6,651,378 B2 | * | 11/2003 | Baker ........................... 43/131 |
| 2002/0157302 A1 | | 10/2002 | Faith et al. |
| 2002/0194774 A1 | | 12/2002 | Lund et al. |
| 2003/0029076 A1 | | 2/2003 | Snell et al. |
| 2003/0126794 A1 | * | 7/2003 | Wisniewski .................... 47/47 |

* cited by examiner

Primary Examiner—Michael J. Carone

(57) ABSTRACT

A bait station for offering a bait to a target insect comprising an open top base, a cap enclosing the open top base and a spike extending downwardly from the base. The base includes a floor, an outer wall that extends upwardly from the floor to an outer rim, and an inner wall that extends upwardly from the floor to an inner rim. The inner wall is spaced inwardly from the outer wall and defines a central bait well for containing insect bait. The base further includes an insect climbable tapered wall extending downwardly and outwardly from the inner wall that cooperates with the outer wall to define a moat that surrounds the bait well, and at least one doorway formed in the outer wall of a size sufficient to permit a target insect ingress to an egress from the bait well.

36 Claims, 5 Drawing Sheets

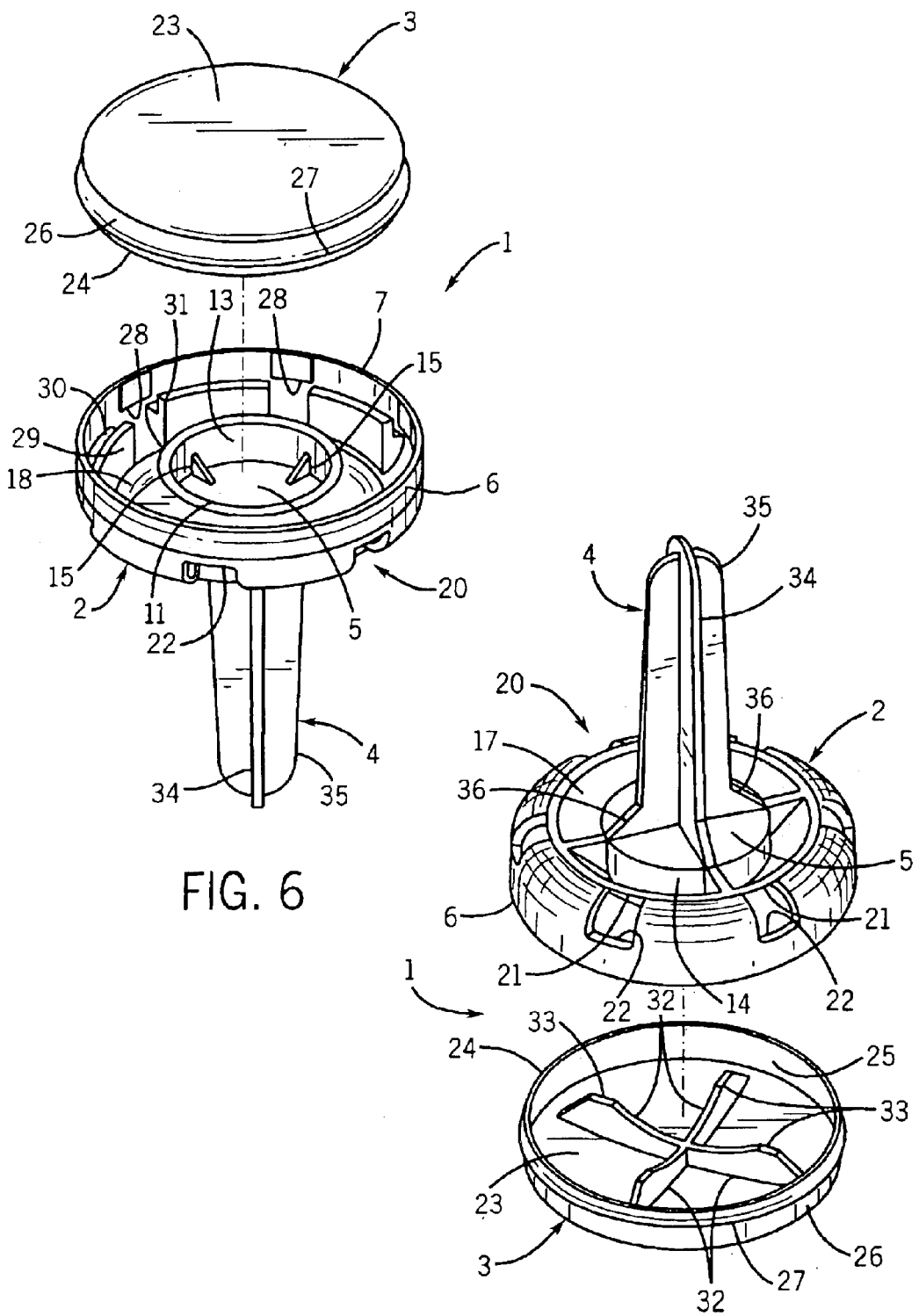

OUTDOOR INSECT BAIT STATION

BACKGROUND OF THE INVENTION

The present invention relates in general to an apparatus for dispensing pesticides, and more particularly to an outdoor insect bait station adapted to be anchored securely in the ground.

One of the most popular and effective methods of combating crawling insects is the use of bait which is commonly positioned around or near the insect nest or near where insects gather food. According to their usual food gathering habits, crawling insects will feed on the poisonous bait and take some of the bait with them back to their nests or homes where the bait is shared with other insects, preferably the queen, and as a result kill a large number of insects. Exposure to outside elements, however, can reduce the life as well as the effectiveness of bait since it can be washed away and/or diluted by rain or when a person waters a lawn, garden or the like. Bait can also be rendered less effective by being blown away by the wind, or spilled as a result of inquisitive household pets, lawn mowers or other undesirable means.

Various devices typically referred to as insect bait stations have been utilized to present bait to crawling insects, and are well known. Typical examples of outdoor insect bait stations are disclosed in U.S. Pat. Nos. 2,837,861; 4,277,907; 4,485,582; 5,325,626; 5,746,021; 5, 918,410; 6,164,010; 6,219,960; 6,298,597; 6,401,384; 6,467,216; 6,474,016 and 6,497,070. Each of the bait stations disclosed in the above patents generally includes a sealable container and a spike or stake attached thereto for insertion into the ground. A plurality of access holes are provided either in the stake or in the container which allow the crawling insects to enter the interior of the container to feed on the poisonous bait. There remains a need, however, for an improved outdoor insect bait station.

SUMMARY OF THE INVENTION

The present invention provides a bait station for offering a bait to a target insect comprising an open top base, a cap closing the open top base and a spike extending downwardly from the base. The base includes a floor, an outer wall that extends upwardly from the floor to an outer rim, and an inner wall that extends upwardly from the floor to an inner rim. The inner wall is spaced inwardly from the outer wall and defines a central bait well for containing insect bait. The base further includes an insect climbable tapered wall extending downwardly and outwardly from the inner wall that cooperates with the outer wall to define a moat that surrounds the bait well, and at least one doorway formed in the outer wall of a size sufficient to permit a target insect ingress to and egress from the bait well.

Since rain and other water can get into outdoor bait stations, the present invention provides a moat that surrounds the bait well and the tapered wall slants downwardly so that water entering the device collects in the moat and will flow to the lowest point of the moat. The doorways formed in the outer wall open to the lowest point in the moat and thus the doorways simultaneously provide the target insects with access to the bait well and also allow any moisture collecting in the moat to drain out from the moat through the doorways.

The bait well inner rim extends higher than the top or lintel of the doorway. As a result, if a puddle of water does form around the entire bait station, as for example in a thunderstorm or if a lawn is watered, the cap traps a bubble of air that extends slightly below the inner bait well rim. Thus, water can never flow into the bait well, an arrangement that allows the bait to remain dry and undiluted.

The cap is designed to span the open top of the base and cover the bait well. The cap includes a rim extending downwardly from the periphery of the cap ceiling which is designed to be received within the outer base wall surrounding the moat. This makes the cap much more difficult to pry off, and helps to avoid accidental opening of the bait station.

The cap includes interlocking means for releasably connecting the rim of the cap with the outer wall of the base. This interlocking means comprises an outwardly extending cap retention ledge on the cap rim, and an inwardly extending base wall retention ledge on the outer base wall. The cap and base wall retention ledges are engaged in a snap fit arrangement when the cap is inserted into the base so as to resist removal of the cap from the base. In addition, cap supports on the inside of the outer base wall have support surfaces that engage the rim of the cap and prevent the cap from being pushed too far into the base. This insures that the cap ceiling remains sufficiently above the bait well rim that insects can obtain access to the bait by crawling up the tapered wall, over the well rim and into the central bait well. The cap also includes cap struts extending across the underside of the cap ceiling and downwardly therefrom. The cap struts engage the inner well rim of the base to support the cap ceiling and to enable force exerted downwardly against the cap to be transmitted via the cap strut to the well wall and thereby to the spike.

The above advantages of the present invention will be apparent from the drawings, as well as from the description of claims which follow.

BRIEF DESCRIPTION OF THE DRAWINGS

The drawings illustrate the best mode presently contemplated of carrying out the invention.

In the drawings:

FIG. 6 is an exploded perspective view of the components of the insect bait station taken from above the bait station; and FIG. 7 is an exploded perspective view of the components of the insect bait station taken from below the bait station.

DETAILED DESCRIPTION OF THE INVENTION

Figure 1:
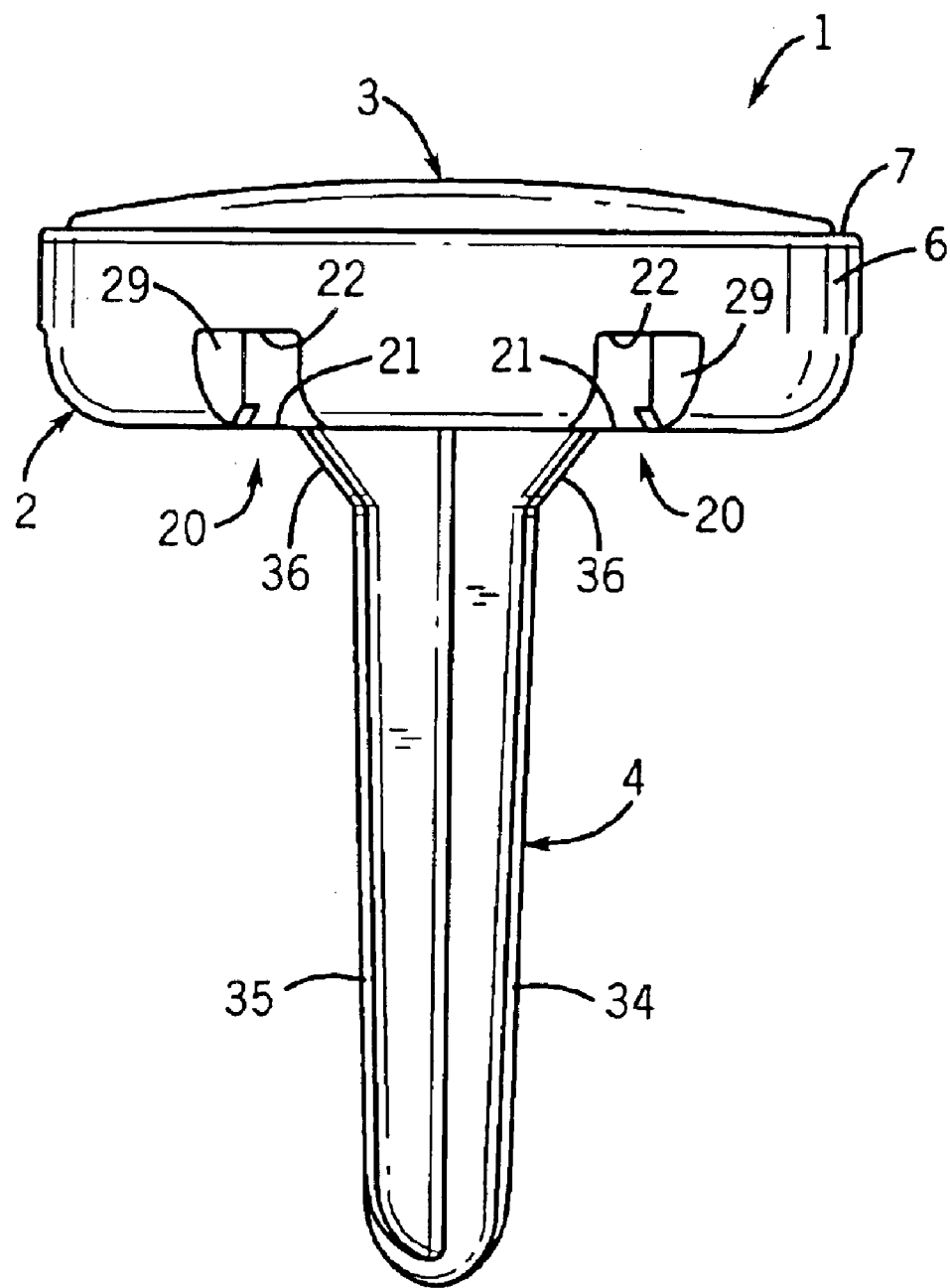
FIG. 1 is a side view in elevation of an insect bait station constructed in accordance with the principles of the present invention.
Figure 2:
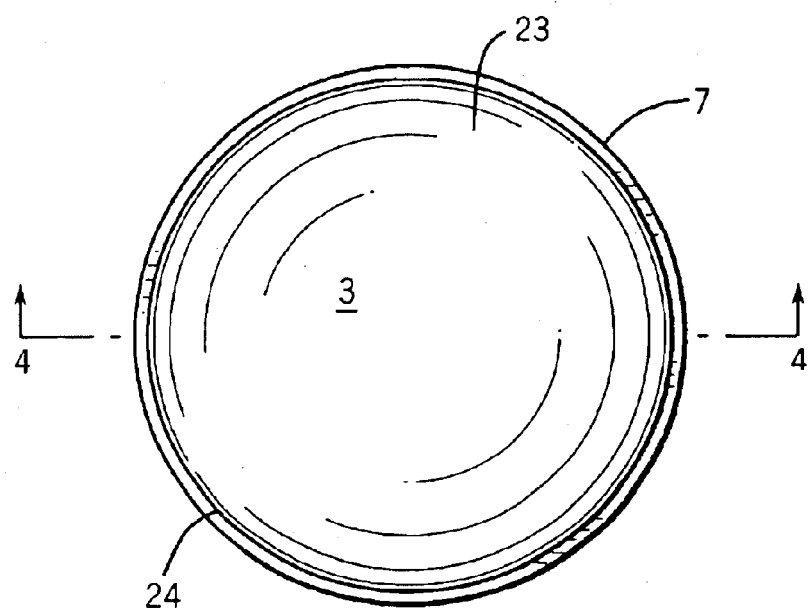
FIG. 2 is a top plan view of the insect bait station.

Referring now to the drawings, FIGS. 1–7 illustrate an insect bait station generally designated by the numeral 1 constructed in accordance with the present invention. The bait station 1 includes three major components, namely, an open top base generally designated by the numeral 2, a cap generally designated by the numeral 3, and a spike or elongated stake generally designated by the numeral 4. Although bait station 1 is designed for use outdoors, indoor use is also possible. In addition, bait station 1 is intended primarily for offering bait to crawling insects. The term "crawling insects" includes cockroaches, ants, spiders, and the like. Finally, as used herein, the term "bait" refers to any of a number of solid bait-toxicant formulations well known in the art, preferably one having a delayed kill action. An example of a suitable bait-toxicant comprises: boric acid (at 2% by weight), sugar/corn sweetener (at 15% by weight), preservative such as that commonly sold under the trademark "Legend MK" (at 0.2% by weight), carageenan (at 1.2% by weight) and water (at 81.6% by weight).

The base 2 is best illustrated in FIGS. 1 and 3–7. FIG. 6 best illustrates base 2 as having an open top, and FIGS. 4 and 5 best illustrate the internal components of base 2. As illustrated, base 2 includes a relatively flat floor 5 and an outer annular wall 6 that extends upwardly from floor 5 to an outer rim 7 to form a cup shaped or bowl shaped open top configuration. Outer wall 6 includes an inner surface 8 facing the interior of base 2, and an outer surface 9 facing the exterior of base 2. Base 2 also includes an inner annular wall 10 that extends upwardly from floor 5 to 8S an inner rim 11. The inner wall 10 is spaced inwardly from outer wall 6, and inner wall 10 defines a central bait well 12 for containing insect bait (not shown). The insect bait is preferably in solid form, but may also be a liquid, gel or semi-solid composition.

Figure 4:
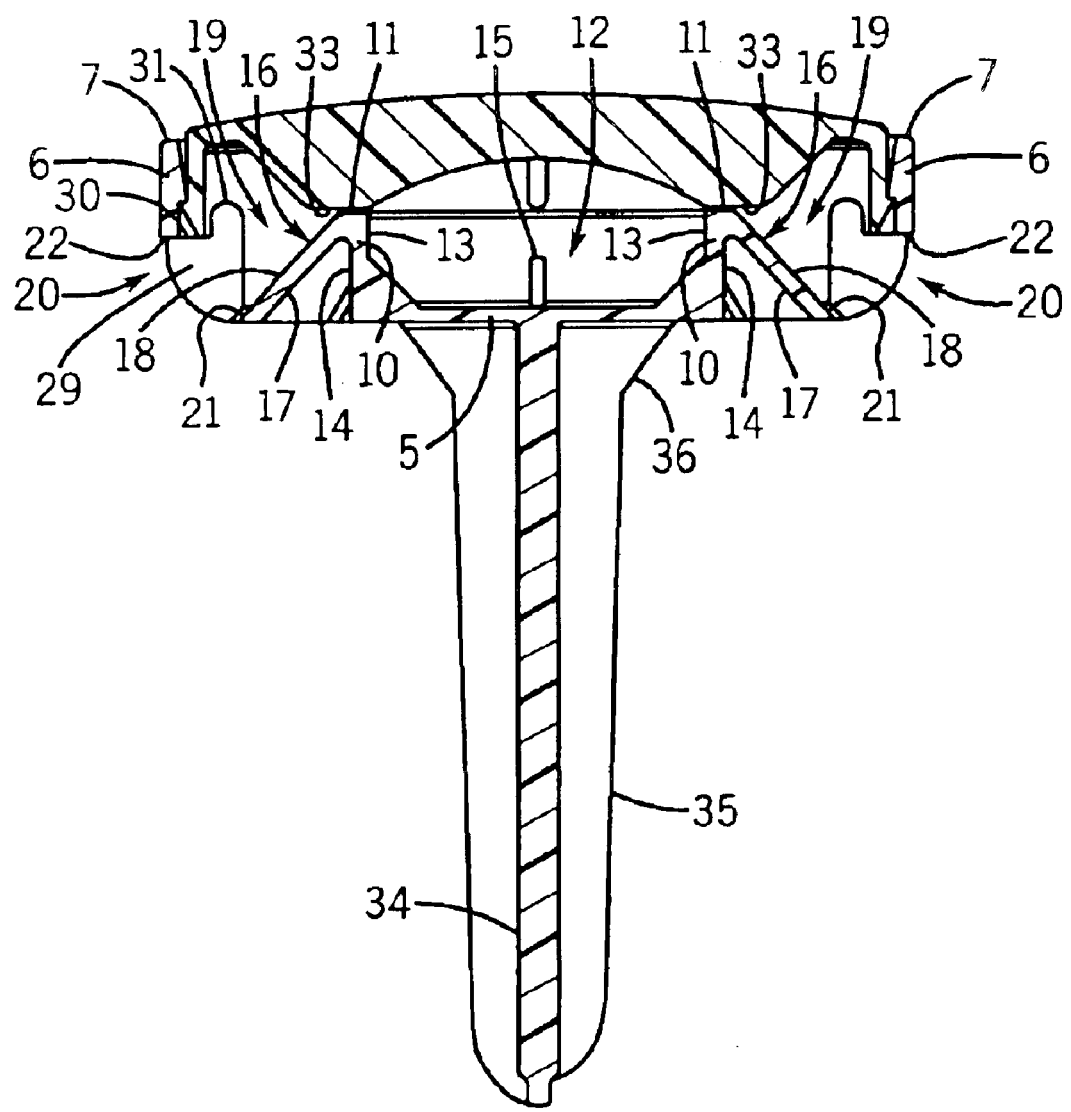
FIG. 4 is a longitudinal cross-sectional view taken along the plane of the line 4—4 in FIG. 2.
Figure 5:
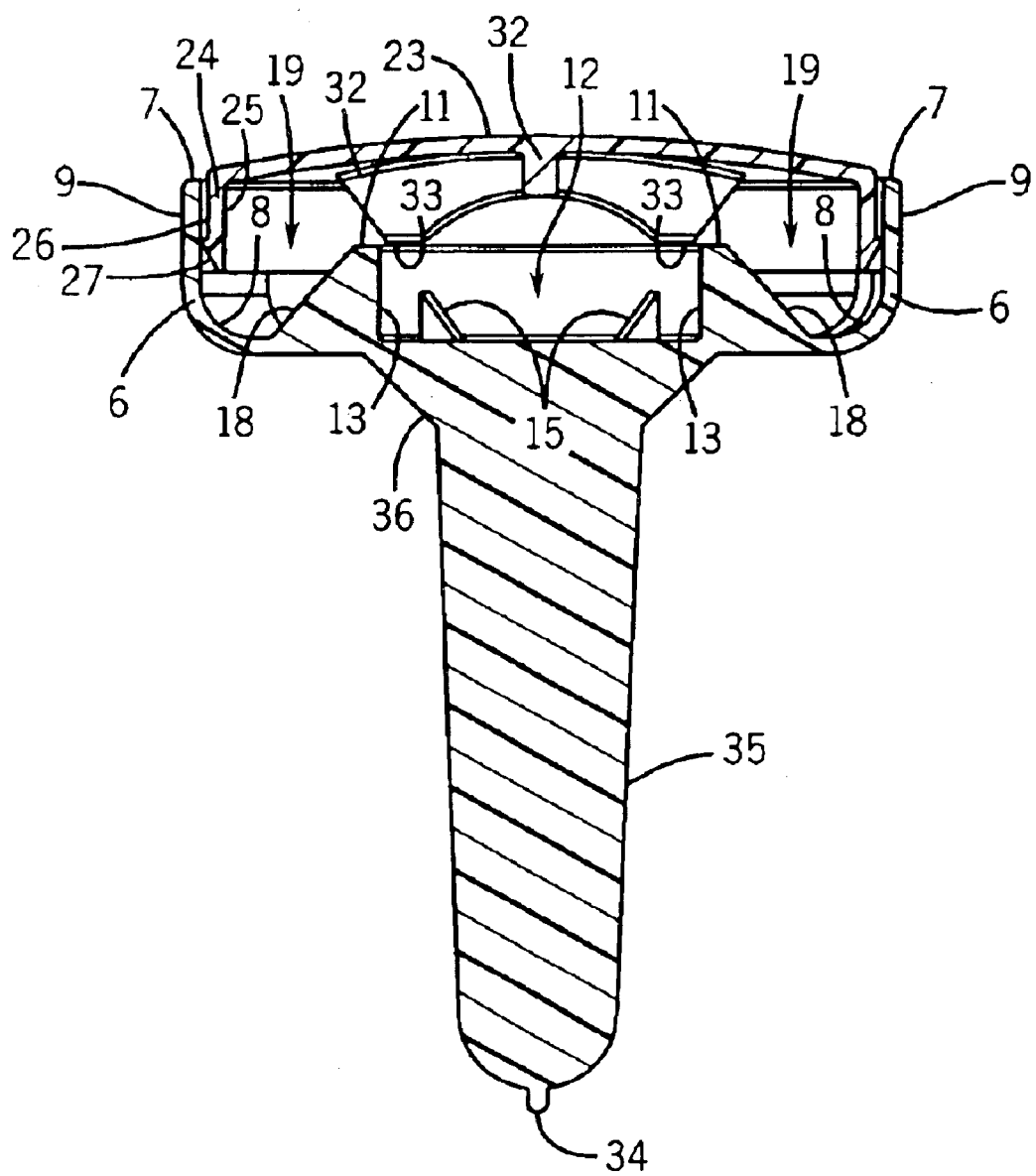
FIG. 5 is a longitudinal cross-sectional view taken along the plane of the line 5—5 in FIG. 3.

As shown best in FIGS. 4 and 5, inner wall 10 includes an inner surface 13 extending substantially vertically from floor 5 and facing the interior of bait well 12. Inner wall 10 also includes an outer surface 14 extending vertically from floor 5 facing exteriorly of bait well 12 toward outer wall 6. A plurality of triangular-shaped braces 15 extend between the floor 5 of bait well 12 and the vertical inner surface 12 of inner wall 10. Braces 15 not only provide support for inner wall 10, but also provide a mechanism for retaining bait, especially in solid form, within bait well 12.

As illustrated, inner rim 11 of wall 10 and outer rim 7 of wall 6 are annular in shape with inner rim 11 being concentrically disposed with respect to outer rim 7. It should be noted, however, that configurations other than circular are contemplated for the shape of walls 6 and 10, and rims 7 and 11, respectively. For example, these components could be square, rectangular, oval, or polygonal in shape. Further, if desired, one wall could take on one configuration e.g. inner wall 10 and rim 11 could be circular, while the other wall could take on a different configuration, i.e. outer wall 6 and rim 7 could be square, or vice versa. Thus, bait station 1 is not limited to the specific shape and/or configuration illustrated, but may be constructed in various different shapes, sizes and configurations.

As shown best in FIGS. 4–6, base 2 also includes an insect climbable tapered wall 16 that surrounds bait well 12 and extends downwardly and outwardly from inner rim 11 to the base of outer wall 6. Wall 16 is tapered at an angle of from about 40° to about 60°, and is preferably about 50° so as not to inhibit the ability of crawling insects to climb wall 16 and feed on the bait contained within bait well 12. The necessary angle differs widely from material to material and is not crucial so long as the target insect finds the wall 16 to be climbable. Wall 16 has an inner surface 17 facing outer surface 14 of inner wall 10, and an outer surface 18 facing inner surface 8 of outer wall 6. Tapered wall 16 thus cooperates with outer wall 6 to define a moat 19 that surrounds bait well 12. As shown best in FIGS. 4 and 5, tapered wall 16 has an upper end contiguous with inner rim 11, and a lower end contiguous with the base or lowermost point of outer wall 6. However, depending upon the dimensions and the particular design for bait station 1 desired, the upper end of wall 16 could be spaced slightly downwardly from inner rim 11, or the lower end of wall 16 could be spaced slightly inwardly from the base of outer wall 6. This would depend upon the angle desired for wall 16 and the space available between tapered wall 16 and outer wall 6.

As shown best in FIGS. 1, 6 and 7, base 2 also includes at least one and preferably a plurality of doorways 20 formed in outer wall 6. Each doorway 20 has a size sufficient to permit a target insect ingress to and egress from bait well 12. As illustrated, there are six doorways 20 equi-angularly spaced from each other and circumferentially about the base or lower end of outer wall 6. As illustrated, each doorway 20 is substantially rectangular in shape and includes a lower sill 21 contiguous with the lower end of tapered wall 16, as shown best in FIG. 4. Each doorway 20 also includes an upper lintel 22, and as shown best in FIG. 4 inner rim 11 is located above each upper lintel 22, the purpose of which will hereinafter be described. Each doorway 20 opens directly into moat 19, and each lower sill 21 is located at the lowest point in moat 19 so that the doorways 20 simultaneously provide a target insect with access to bait well 12 and also allow any moisture collecting in moat 19 to drain out from moat 19 through the doorways 20.

As shown best in FIGS. 5–7, cap 3 encloses the open top of base 2 and covers bait well 12. Cap 3 includes dome-shaped cap ceiling 23 that spans the open top of base 2 and defines an outer circular periphery having a diameter substantially matching the diameter of outer wall 6. Cap 3 also includes an annular rim 24 extending downwardly from the outer periphery of cap ceiling 23. Rim 24 includes an inner annular surface 25 facing the interior of cap 3, and an outer annular surface 26 facing exteriorly of cap 3. As shown best in FIGS. 4 and 5, cap 3 is configured to be inserted within outer wall 6 so that outer surface 26 of rim 24 frictionally engages the inner surface 8 of outer wall 6.

In order to retain cap 3 on base 2, cap 3 includes interlocking mean for releasably interconnecting the rim 24 with the outer wall 6 of base 2. As shown best in FIGS. 4 and 5, this interlocking mechanism comprises an outwardly extending cap retention ledge on the outer surface 26 of rim 24, and an inwardly extending base wall retention ledge 28 formed on the inner surface 8 of outer wall 6. When cap 3 is inserted into the open top of base 2, cap retention ledge 27 engages wall retention ledge 28 in a snap-fit arrangement so as to resist removal of cap 3 from base 2. It should be noted that the wall retention ledges 28 are equi-angularly spaced apart from one another and circumferentially disposed about inner surface 8 of outer wall 6 directly above each doorway 20, as shown best in FIG. 7. On the other hand, cap retention ledge 27 is formed so as to completely surround and extend outwardly from rim 24. Thus, there is no need to specifically orient the cap 3 when it is inserted within the base 2.

Cap 3 also includes a plurality of cap supports in the form of brackets 29 that project inwardly from inner surface 8 of outer wall 6. Each cap support bracket 29 provides a support surface 30 that engages the edge of rim 24 of cap 3 to limit the downward movement of cap 3 within base 2 when cap 3 is inserted into base 2. Support surfaces 30 are substantially horizontal, and brackets 29 are located on each side of the doorways 20. Each cap support bracket 29 also includes a vertically extending guide member 31 located at the innermost edge of surface 30. Guide members 31 have rounded upper ends which help guide and seat the lower end of rim 24 on surfaces 30 of brackets 29. Furthermore, the guide members 31 engage inner surfaces of the rim 24 and thus serve to prevent inward movement of the lower edge of rim 24, ensuring that the cap retention ledge 27 and base wall retention ledge 28 remain engaged, even if the insect bait station 1 is subjected to twisting or otherwise deforming stress. Thus, as cap 3 is pushed into base 2, guides 31 insure that the lower edge of rim 24 engages the support surfaces 30 of brackets 29 to prevent the cap 3 from being pushed too far into base 2.

Figure 3:
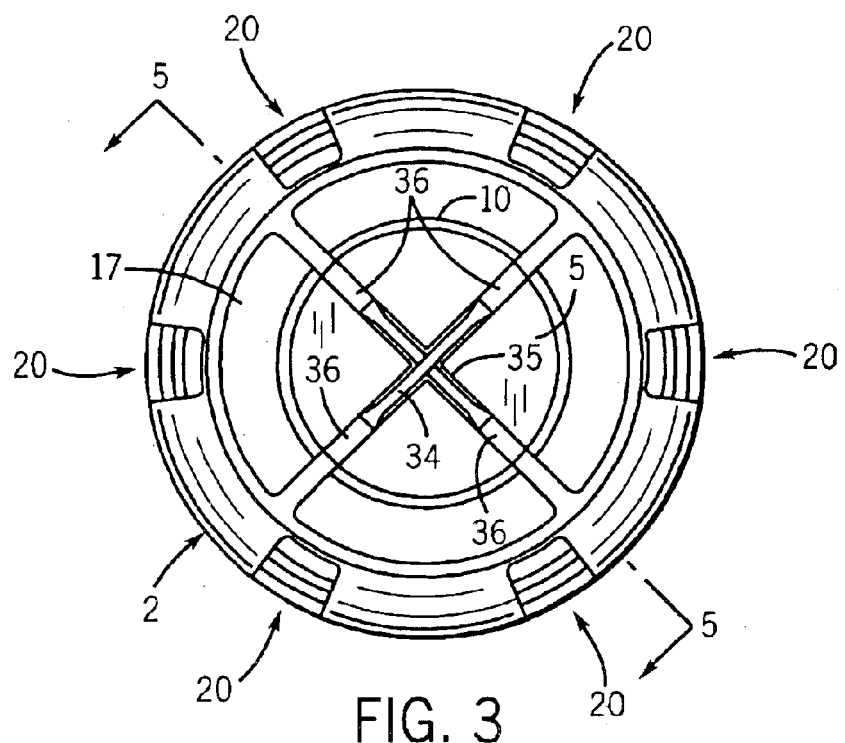
FIG. 3 is a bottom plan view of the insect bait station.

As shown best in FIGS. 3 and 6, cap 3 further includes a pair of cap struts 32 extending across and projecting downwardly from the underside of cap ceiling 23. Struts 32 intersect at 90° angles to one another, and each cap strut 32 includes a landing 33 which contacts or engages against inner rim 11 of bait well 12 to support and brace cap 3 against the inner wall 10. The engagement of landings 33 against inner rim 11 helps support the cap ceiling 23 and are designed to transmit force directly to the spike 4 when a person pushes down on cap 3, without stressing the other components of bait station 1. As shown best in FIG. 4, cap struts 32 will transmit force directly to inner wall 10 and then to spike 4. Struts 32 also function to space cap ceiling 23 sufficiently far above bait well rim 11 so that insects can access bait contained within bait well 12. Without struts 32, it is possible that cap 3 might collapse into a concave configuration when pushed into base 2, or when bait station 1 is inserted into the ground either by a user pushing it into the ground or utilizing a hammer to pound on cap 3.

As shown best in FIGS. 1 and 4–6, spike 4 comprises a longitudinally extending stake extending downwardly from beneath the well floor 5 of base 2. Spike 4 is positioned so that force exerted downwardly against cap 3 is transmitted via the cap struts 32 to the well wall 10 and thereby to spike 4. Spike 4 includes first and second vanes 34, 35 disposed cross-wise of each other with vane 34 extending a distance slightly greater than vane 35. Preferably, vanes 34 and 35 intersect at 90° angles to form a "X" cross-section, but other angles are contemplated. While the "X" structure provides rigidity and strength for spike 4, the tip of vane 34 initially pierces the ground and only subsequently does the tip of vane 35 enter the ground so that the force of the initial puncture is distributed into two parts. This makes it easier for a user to insert the bait station 1 into the ground and helps to avoid excess forces on the bait station 1 which could break or bend components. The upper end of spike 4 includes vane braces 36 extending laterally from the top portion of vanes 34 and 35 to extend under the inner well wall 10. Once again, braces 36 aid in transmitting downward force applied to cap 3 directly to vanes 34 and 35 of spike 4.

In the preferred embodiment, base 2 and spike 4 are made of a strong, durable plastic material and are molded together so as to form a single integrated unit. The preferred material is polyethylene or polypropylene, and the preferred method of construction is via conventional injection molding. However, it is contemplated that base 2 and spike 4 could be separate pieces which are thereafter joined together such as by threadedly engaging each other or by being heat sealed together or adhesively affixed to one another. Advantageously, the preferred embodiment offers a strong and rigid unitary plastic construction which can be pressed into the ground by hand or hammered into the ground if necessary. However, other materials of construction, such as metal, are also possible.

While this invention has been described with reference to what is currently considered to be the preferred embodiment, it is to be understood that the invention is not limited to the disclosed embodiment. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

We claim:

1. A bait station for offering a bait to a target insect, comprising:
   a. an open top base having a floor, an outer wall that extends upwardly from the floor to an outer rim, and an inner wall that extends upwardly from the floor to an inner rim, said inner wall being spaced inwardly from said outer wall to define a central bait well for containing insect bait, said base further including:
      i. an insect-climbable tapered wall extending downwardly and outwardly from said inner wall that cooperates with said outer wall to define a moat that surrounds said bait well, and
      ii. at least one doorway, formed in said outer wall, the doorway having a size sufficient to permit a target insect ingress to and egress from said bait well;
   b. a cap enclosing the open top base and covering said bait well, said cap includes a cap ceiling having an outer periphery, and a rim extending downwardly from the outer periphery of the cap ceiling, and wherein the cap rim is located adjacent to and interiorly of the outer wall such that the outer periphery of said cap ceiling is disposed substantially flush with the outer rim of said outer wall, and wherein said cap further includes a cap strut extending across the underside of said cap ceiling and downwardly therefrom, the cap strut engaging the inner rim of said base to support the cap ceiling; and
   c. a spike extending downwardly from the base.

2. The bait station of claim 1 wherein said tapered wall has an upper end contiguous with said inner rim.

3. The bait station of claim 1 wherein said tapered wall has a lower end contiguous with said outer wall.

4. The bait station of claim 3 wherein said doorway includes a lower sill, said lower sill being contiguous with the lower end of said tapered wall.

5. The bait station of claim 1 wherein said doorway opens directly into said moat.

6. The bait station of claim 1 wherein said doorway includes an upper lintel, and said inner rim is located above said upper lintel.

7. The bait station of claim 6 wherein said outer rim is located above said inner rim.

8. The bait station of claim 1 wherein said spike includes first and second vanes, the first vane extending downwardly further than the second vane.

9. The bait station of claim 1 further including interlocking means for releasable interconnecting the rim of said cap with the outer wall of said base.

10. The bait station of claim 9 wherein said interlocking means comprises an outwardly extending cap retention ledge on said cap rim and an inwardly extending base wall retention ledge on said outer wall, the cap and base wall retention ledges being engaged in a snap-fit arrangement so as to resist removal of the cap from the base.

11. The bait station of claim 10 further including a cap support that extends inwardly from the outer wall, said cap support providing a support surface against which the rim of the cap is engaged, and limiting the downward movement of the cap within the base.

12. A bait station for offering a bait to a target insect, comprising:
   a. an open top base including
      i. a bait well having a well floor and an inner well wall that extends upwardly from the well floor to an inner well rim, a moat surrounding and extending lower than the well rim, and an insect-climbable tapered surface extending upwardly from the moat to the well rim;

ii. an outer base wall surrounding the moat that extends upwardly to an outer rim and defining the exterior perimeter of the base; and iii. a doorway formed in the outer base wall, the doorway having a size sufficient to admit a target insect;

b. a cap spanning the open top of the base and covering the bait well, the cap having i. a cap ceiling having an outer periphery;

ii. a cap rim extending downwardly from the periphery of the cap ceiling, said cap rim located adjacent to and interiorly of the outer base wall such that the outer periphery of said cap ceiling is disposed substantially flush with the outer rim of said outer base wall; and iii. a cap strut extending across the underside of the cap ceiling and downwardly therefrom, the cap strut contacting the inner well rim to brace the cap against the inner well rim; and c. a longitudinally extended spike extending downwardly from beneath the well floor, the spike being positioned so that force exerted downwardly against the cap is transmitted via the cap strut to the well wall and thereby to the spike.

13. The bait of claim 12 wherein the spike includes a vane that extends downwardly from a top portion of the spike for a selected distance, the vane including vane braces extending laterally at the top portion of the spike to extend under the inner well wall to transmit downward force therefrom to the vane.

14. The bait station of claim 12 wherein the spike includes first and second longitudinal vanes, the first vane extending downwardly further than the second vane.

15. The bait station of claim 12 wherein the cap rim has an outwardly extending cap retention ledge and the outer base wall has an inwardly extending base wall retention ledge, the cap and base wall retention ledges being engaged in a snap-fit arrangement so as to resist removal of the cap from the base.

16. The bait station of claim 15 further including a cap support that extends inwardly from the outer base wall, providing a support surface against which the rim of the cap is engaged, limiting the downward movement of the cap within the base.

17. The bait station of claim 12 wherein the outer base wall extends upwardly from a lowest portion of the moat, and wherein the doorway extends upwardly from a lowermost portion of the outer base wall, to simultaneously provide the target insect with access to the bait well and allow any moisture collecting in the moat to drain out from the moat through the doorway.

18. A bait station for offering a bait to a target insect, comprising:

a. an open top base having a floor, an outer wall that extends upwardly from the floor to an outer rim, and an inner wall that extends upwardly from the floor to an inner rim, said inner wall being spaced inwardly from said outer wall to define a central bait well for containing insect bait, said base further including:

i. an insect-climbable tapered wall extending downwardly and outwardly from said inner wall that cooperates with said outer wall to define a moat that surrounds said bait well, and ii. at least one doorway formed in said outer wall, the doorway having a size sufficient to permit a target insect ingress to and egress from said bait well and said doorway further having an upper lintel disposed at a height from said floor such that said inner rim is located above said upper lintel; and b. a cap enclosing the open top base and covering said bait well, said cap includes a cap ceiling having an outer periphery, and a rim extending downwardly from the outer periphery of the cap ceiling, and wherein the cap rim is located adjacent to and interiorly of the outer wall such that the outer periphery of said cap ceiling is disposed substantially flush with the outer rim of said outer wall, and wherein said cap further includes a cap strut extending across the underside of said cap ceiling and downwardly therefrom, the cap strut engaging the inner rim of said base to support the cap ceiling.

19. The bait station of claim 18 wherein said tapered wall has an upper end contiguous with said inner rim.

20. The bait station of claim 18 wherein said tapered wall has a lower end contiguous with said outer wall.

21. The bait station of claim 20 wherein said doorway includes a lower sill, said lower sill being contiguous with the lower end of said tapered wall.

22. The bait station of claim 18 wherein said doorway opens directly into said moat.

23. The bait station of claim 18 wherein said outer rim is located above said inner rim.

24. The bait station of claim 18 further including a spike extending downwardly from said base.

25. The bait station of claim 24 wherein said spike includes first and second vanes, the first vane extending downwardly further than the second vane.

26. The bait station of claim 18 further including interlocking means for releasable interconnecting the rim of said cap with the outer wall of said base.

27. The bait station of claim 26 wherein said interlocking means comprises an outwardly extending cap retention ledge on said cap rim and an inwardly extending base wall retention ledge on said outer wall, the cap and base wall retention ledges being engaged in a snap-fit arrangement so as to resist removal of the cap from the base.

28. The bait station of claim 27 further including a cap support that extends inwardly from the outer wall, said cap support providing a support surface against which the rim of the cap is engaged, and limiting the downward movement of the cap within the base.

29. A bait station for offering a bait to a target insect, comprising:

a. an open top base including i. a bait well having a well floor and an inner well wall that extends upwardly from the well floor to an inner well rim, a moat surrounding and extending lower than the well rim, and an insect-climbable tapered surface extending upwardly from the moat to the well rim;

ii. an outer base wall surrounding the moat that extends upwardly to an outer rim and defining the exterior perimeter of the base; and iii. a doorway formed in the outer base wall, the doorway having a size sufficient to admit a target insect; and b. a cap spanning the open top of the base and covering the bait well, the cap having i. a cap ceiling having an outer periphery;

ii. a cap rim extending downwardly from the periphery of the cap ceiling, said cap rim located adjacent to and interiorly of the outer base wall such that the outer periphery of said cap ceiling is disposed substantially flush with the outer rim of said outer base wall; and iii. a cap strut extending across the underside of the cap ceiling and downwardly therefrom, the cap strut contacting the inner well rim to brace the cap against the inner well rim.

30. The bait station of claim 29 wherein the cap rim has an outwardly extending cap retention ledge and the outer base wall has an inwardly extending base wall retention ledge, the cap and base wall retention ledges being engaged in a snap-fit arrangement so as to resist removal of the cap from the base.

31. The bait station of claim 30 further including a cap support that extends inwardly from the outer base wall, providing a support surface against which the rim of the cap is engaged, limiting the downward movement of the cap within the base.

32. The bait station of claim 29 wherein the outer base wall extends upwardly from a lowest portion of the moat, and wherein the doorway extends upwardly from a lowermost portion of the outer base wall, to simultaneously provide the target insect with access to the bait well and allow any moisture collecting in the moat to drain out from the moat through the doorway.

33. The bait station of claim 32 wherein said doorway has an upper lintel disposed at a height from said floor such that said inner rim is located above said upper lintel.

34. The bait station of claim 29 further including a longitudinally extended spike extending downwardly from beneath the well floor, the spike being positioned so that force exerted downwardly against the cap is transmitted via the cap strut to the well wall and thereby to the spike.

35. The bait station of claim 34 wherein the spike includes a vane that extends downwardly from a top portion of the spike for a selected distance, the vane including vane braces extending laterally at the top portion of the spike to extend under the inner well wall to transmit downward force therefrom to the vane.

36. The bait station of claim 34 wherein the spike includes first and second longitudinal vanes, the first vane extending downwardly further than the second vane.

\* \* \* \* \*